United States Patent
Maillot

[15] 3,665,189
[45] May 23, 1972

[54] RADIATION COUNTING TUBE OF THE GEIGER-MULLER TYPE

[72] Inventor: Jean-Paul Maillot, Meudon, France
[73] Assignee: International Standard Electric Corporation, New York, N.Y.
[22] Filed: Jan. 22, 1970
[21] Appl. No.: 4,968

[52] U.S. Cl. .............................................250/83.6 R, 313/93
[51] Int. Cl. .............................................................G01t 1/18
[58] Field of Search ...............................250/83.6 R; 313/93

[56] References Cited

UNITED STATES PATENTS

| | | | |
|---|---|---|---|
| 2,657,315 | 10/1953 | Goldstein | 250/83.6 R |
| 2,917,647 | 12/1959 | Fowler et al. | 250/83.6 R X |
| 3,259,775 | 7/1966 | Nienhuis et al. | 250/83.6 R X |
| 3,346,754 | 10/1967 | Natanagara et al. | 250/83.6 R X |
| 3,478,205 | 11/1969 | Sporek | 250/83.6 R X |

Primary Examiner—Archie R. Borchelt
Attorney—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

A radiation counting tube includes a plurality of longitudinally disposed cathode sections of different sensitivities coaxially surrounding a common anode to permit simplified measurement of a wide range of radiation on a single meter scale without switching.

10 Claims, 5 Drawing Figures

Patented May 23, 1972

Inventor
JEAN-PAUL MAILLOT

By Edward Goldberg
Attorney

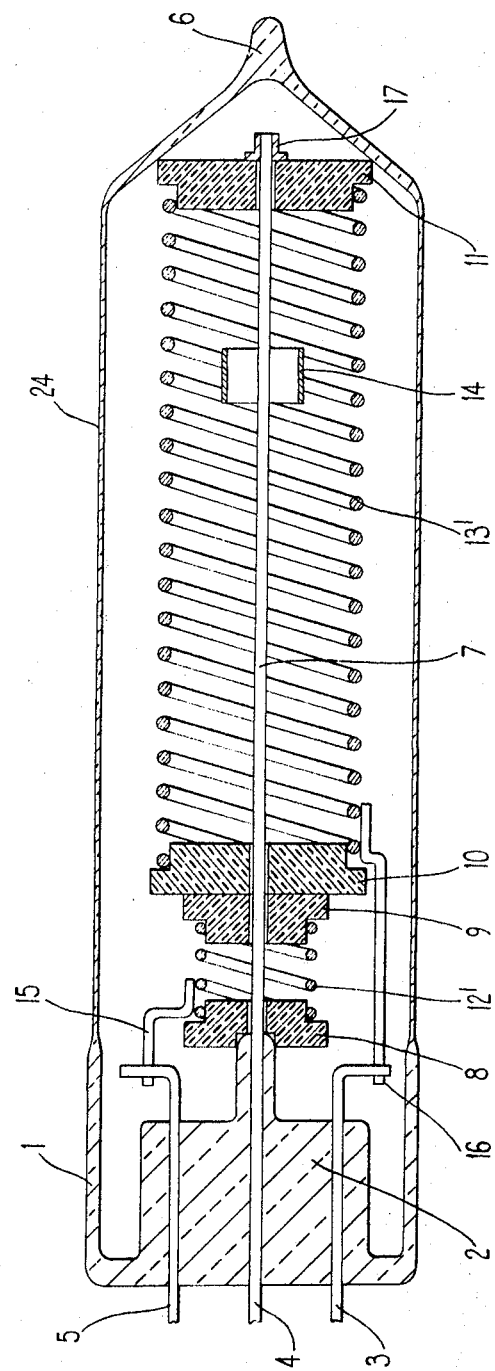

RADIATION COUNTING TUBE OF THE GEIGER-MULLER TYPE

BACKGROUND OF THE INVENTION

1. Field of the Invention

The present invention relates to radiation counting tubes of the Geiger-Muller type and particularly to a tube having a plurality of sensitive elements with different sensitivities to permit measurements over a wide range of nuclear radiation.

Counting tubes of this type are primarily used in radiometers designed for simple measurement of amounts of gamma-radiation over a wide range of values, between 0.001 and 1000 Roentgens per hour. Gamma ($\gamma$) radiation at a particular location is measured in Roentgens, R. A Roentgen is defined as an amount of $\gamma$-radiation such that the corpuscular emission which is associated therewith generates in air, per cubic centimeter of air at normal temperature and pressure, ions which convey a quantity of electricity of either sign equal to the electrostatic metric unit or $0.33 \cdot 10^{-9}$ Coulombs. The delivery of $\gamma$-radiation amounts, existing at a given location, is generally measured in Roentgens per hour (R/h).

2. Description of the Prior Art

Several types of radiometers are presently known that allow measurement of the delivery of $\gamma$-radiation amounts. The desired qualities for these devices are:

a. good precision (from $\pm 10\%$ to $\pm 20\%$),
b. good stability over a period of time,
c. good resistance to environmental conditions,
d. self-sufficiency and small weight, so as to make the apparatus portable, and which implies very simple electronic circuits,
e. low cost, especially in military applications where it is desirable to reach to a widespread area,
f. reading simplicity which will not require any interpretation, and minimum range switching with a large dynamic range,
g. reliable operation without errors which may be caused either by saturation of the $\gamma$-radiation detector or by failure of the detector or any other apparatus components, and also simple electronic circuitry.

In the presently existing radiometers, the above mentioned qualities do not occur together. For instance, some radiometers use an ionization chamber as a detector device. Such radiometers require the use of D.C. amplifiers having a very high gain. Therefore, their stability over a period of time is poor, they are cumbersome, and have a high risk of failure due to intricate electronic circuitry. These shortcomings, together with their high cost, limit the devices to use as special laboratory apparatus where their extended dynamic measuring range without saturation is desireable.

More currently, radiometers have been made using counting tubes as detectors which operate on the well known Geiger-Muller principle. Such detectors will be called hereinafter "GM-tubes." In a widely used type of apparatus, the GM-tube is supplied with a stabilized D.C. voltage slightly above the Geiger-Muller threshold voltage. Under the action of $\gamma$-radiation, it yields pulses of even amplitude or "shots" at a recurring frequency which is an increasing function of the received amount of radiation. After shaping of the pulses, an integrating circuit transforms this recurring frequency into a direct current, the strength of which measures the radiation.

This type of radiometer is thus rather simple, inexpensive and has good precision and stability over a period of time. However, it has a major drawback which limits its use. This is due to the complex variation of the "counting rate" (number of shots per second) as a function of radiation quantity, wherein for small values and over a range of about 10 decibels (dB), the response is linear, then, for larger quantities and over another 15 dB, a gradual saturation makes the response almost logarithmic and eventually full saturation occurs. When these three ranges are taken into account, it will be understood that it is difficult to provide an apparatus having simple electronic circuitry and easy maintenance while also being able to serve the whole dynamic range of about 25 dB extending from the threshold of detection to saturation.

Attempts to obviate these drawbacks of GM-tube type radiometers have used several operating modes with switching between six ranges, each covering 10 dB. The interference of the saturation effect was avoided by eliminating use of a D.C. voltage for measuring large quantities and by substituting voltage pulses having decreasing widths in the higher ranges. Radiometers using such principles, however are very costly, cumbersome and have a heavy consumption of electricity which limits their self-sufficiency.

In a common use of a GM-tube, it is possible to count the "shots" by an integration operation external to the tube employing an ordinary microammeter to measure the mean current delivered under the action of the radiation. When the pulses that correspond to the shots are of even amplitudes, it is obvious that the mean current will be proportional to the counting rate. This type of radiometer, also has the same qualities and drawbacks of the shot-counter type, particularly regarding the shape of the response curve.

Further improvements have enlarged the dynamic range for the logarithmic response by adding the currents from two GM-tubes having different sensitivities and subjected to the same $\gamma$-radiation. In principle, the less sensitive tube becomes effective to operate at an amount of radiation which corresponds to the saturation of the more sensitive one. This permits measurements of about 30 dB in a logarithmic range which can be read out on one common dial, without any range switching. In addition, a linear graduation can be added at the beginning of the scale for small radiation values, which brings the entire range of the radiometer to 40 dB. In practice, this very simple device has two drawbacks: it requires very stable tubes having like variations over a period of time; and there is a risk of great error in the measurements when the less sensitive tube fails.

Of course, three, four, or more GM-tubes can be used and the currents therein added, but the indicated drawbacks rise when the number of tubes increases.

SUMMARY OF THE INVENTION

The object of this invention is therefore to provide a multiple GM-tube which will correspond to a set of several independent GM-tubes having different responses but with a single filling of gas, and common envelope to avoid the drawbacks of the simplified radiometers using independent GM-tubes, such as the lack of stability and reliability.

According to a first feature of a multiple GM-tube of the present invention, an anode in the form of a wire is common to several sensitive structures or spaces. A first cylindrical cathode, having a small length and coaxial with the anode defines a first space, sensitive to the strongest radiations; a second cylindrical cathode, having a length and a diameter greater than the first one and also coaxial with the anode, defines a second space sensitive to radiations of less strength, with the sequence of such cathodes, coaxial to the anode, continuing up to the last one which has the largest measurements and is sensitive to the weakest radiations to be measured.

According to another feature of the invention, the relative sizes of the cathodes are determined so that each of the sensitive spaces detects amounts of radiation that vary within a predetermined range of dB, every space reaching its saturation for an amount which corresponds to the threshold of logarithmic operation of the adjacent space of less sensitivity so that the curves for each sensitive space, shows a partial current as a function of the radiation in terms of decibels and are represented by parallel straight lines between the threshold of logarithmic operation and saturation.

According to another feature of the invention, the adjacent sensitive areas are separated by an insulating stack which prevents the ionization in any one of the areas from being propagated toward the others so that the various indications of radiation in the several areas are kept independent.

According to another feature of the invention, the anode wire includes several auxiliary elements or a protrusion or bend, one for each area, except the smallest least sensitive section, so as to effectively bring the wire somewhat closer, at particular portions of its length, to the corresponding cathode, in order to equalize the threshold voltages for the Geiger-Muller operating conditions in the various spaces.

According to another feature of the invention, the cathodes are insulated from one another and each provided with an output lead, so that the current in each section can be measured separately before they are summed up in a common wire. The common wire which is connected to all the cathodes then adds the mean currents to each section to provide a measure of radiation on a single meter scale without range switching.

Further objects and features of the invention will appear in the following specification referring to the accompanying drawings which shown, by way of example, a particular embodiment of the present invention and illustrates the operation thereof.

BRIEF DESCRIPTION OF THE DRAWINGS

FIG. 5 shows a tube with two sensitive sections and spiral shaped cathodes adapted to measure Beta radiation.

DESCRIPTION OF THE PREFERRED EMBODIMENTS

Figure 1:
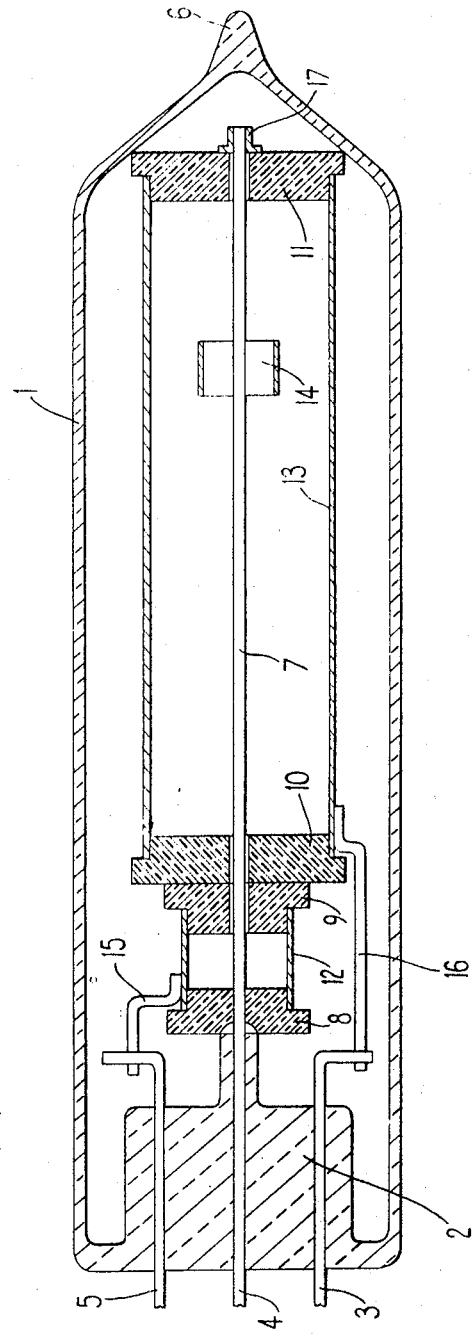
FIG. 1 shows a double section GM-tube according to the invention, designed for measuring Gamma radiations between 50 mR/h and 500 R/h.

The double section GM-tube shown in FIG. 1 is comprised of a glass envelope 1 having an inner diameter of the order of 15 mm. and a thickness of about 1 mm. One end has a pinched base 2 including three air-tight output leads 3, 4 and 5, and the other end has a tip 6 which is sealed after exhaustion. An extension of the central lead 4, preferably of ferrachrome, forms the anode wire 7 having a diameter of about 0.8 mm. Insulating beads 8, 9, 10 and 11 of sintered glass are threaded on anode 7. Beads 8 and 9 are connected by a cylinder 12 which forms the first cathode and defines the first sensitive space. Beads 9 and 10 are adjacent one another. Beads 10 and 11 are connected by a cylinder 13 of a substantially greater size than cylinder 12 and which forms the second cathode defining the second sensitive space. Cylinders 12 and 13 are preferably both of ferrochrome or other suitable conducting material which will not absorb the gas filling the envelope 1.

Anode 7 is provided with a small auxiliary element such as a cylinder or plate 14, which may also be of ferrochrome, designed to enhance the exchange of ions between anode 7 and cathode 13. The elements are of a size adapted to equalize the values of the operation points, particularly the threshold voltages in structure 7, 12 on one hand and structure 7, 13 on the other hand, which define respectively the first space of relatively low sensitivity and the second space of higher sensitivity.

The electrical connections between cathodes 12 and 13 and their outlet leads 5 and 3 may also be made of ferrochrome wires 15 and 16 respectively, which are welded electrically. The whole of the inside structure is secured to the anode by an eyelet 17, preferably of ferrochrome, welded electrically. The circumference of bead 11 rests on the tapered end of the glass envelope 1. Any other suitable known supporting means, can also be used.

The whole of the structure is filled with a mixture of one or more rare gases and halogen vapors, as used in conventional counting tubes. The members forming the structure including the sintered glass beads, fit together in a manner which permits free circulation of the gases.

A particular example of a double section GM-tube is designed to measure radiation between 50 mR/h and 500 R/h on a single scale without switching. The sizes of the cathodes are as follows: cathode 12, inner diameter 5 mm, length 4 mm; cathode 13, inner diameter 10 mm, length 60 mm, with wall thicknesses of 0.2 mm and 0.25 mm, respectively.

The operation of the device is in accordance with the principles of a conventional GM counting tube when the supply voltage exceeds a predetermined value called the Geiger-Muller threshold voltage. It is known that each ionizing event, resulting from a particle or a $\gamma$-photon which passes through the gas, generates an electron. This causes a complex ionization phenomenon and propagation of a discharge which results in a voltage pulse called a "shot." The time for restoring the normal conditions of the electric field near the anode wire, for the latter to operate again under the action of another ionizing event, is of the order of a few tens of microseconds; when such a second event occurs during that dead time, it is not counted.

For small values of radiation, the counting rate N, i.e. the number of shots per second, is proportional to the quantity so that a sensitivity $s = N/R/h$ can be defined. Following this linear region, which extends from a practical readable threshold through a dynamic range of about 10 dB of radiation, the counting rate N increases more slowly because of increasing saturation from the effects of the dead times, and varies as a function of R/h in accordance with approximately a logarithmic response through a range of about 15 dB. Eventually, a total saturation occurs.

The sensitivity $s$ is approximately proportional to the effective surface of the GM-tube, i.e. the area of a rectangle obtained by the intersection of the cathode cylinder and a plane which comprises the axis of the latter. When considering two conventional simple GM-tubes that only differ as to their effective surface (the ratio between the two surfaces being assumed to be $r$), their sensitivities will have the same ratio $r$, and in the linear region, the two GM-tubes will have the same counting rate N for radiation amounts that will also have the same ratio $r$.

Experience shows that what has been stated above also occurs in the region of logarithmic response and at saturation. In other words, when response curves $a$ and $b$ of two GM-tubes are drawn in the same diagram, as shown in FIG. 2, with the counting rates N in ordinates and deliveries of amount R/h, measured in decibels, in abscissae, it can be stated that curves $a$ and $b$ can be superimposed by a mere translation parallel to the axis of abscissae and amount to $10 \log r$.

This is also true when current I, which the GM-tube delivers under the action of the radiation, is measured instead of counting the shots per second. Since the pulses which correspond to the shots are of even amplitude, the mean current I is proportional to the number of these pulses in a unit of time. Therefore, the abscissae in FIG. 2 can be graduated in terms of current I as well as of counting rate N. When the two currents corresponding to the two simple GM-tubes are summed up, assuming that the extent of each of the regions has a quasilogarithmic response range of $p$ dB represented by the straight portions of curves $a$ and $b$ in FIG. 2 which amount to $10 \log r$, it can be stated that the resulting curve $c$ in FIG. 2, drawn as a dotted line, is a straight line with a range of $2p$ dB or about 30 dB. The ratio $r$ between the effective areas of the two simple GM-tubes is thus of about $10^{p/10}$ or 30.

Figure 2:
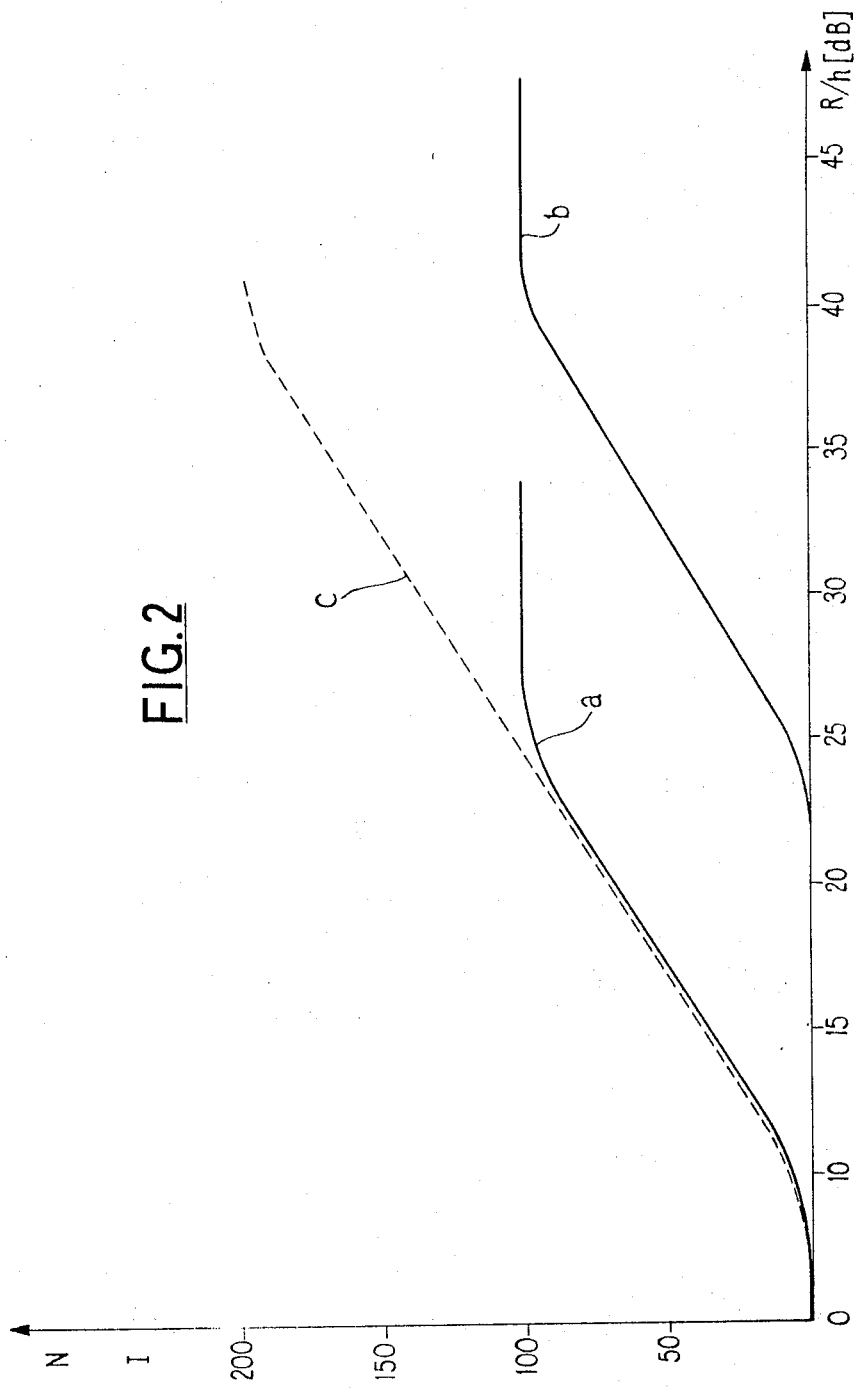
FIG. 2 is a diagram which shows the curves of the partial currents detected in each sensitive space as well as their sum as a function of radiation measured in dB.

Taking into account the measuring principle, it is essential that the relative positions of curves $a$ and $b$ in FIG. 2 remain constant, otherwise the resultant curve $c$ can be mishaped. This may happen ordinarily when the relative variations of sensitivity of the two simple GM-tubes, which may change with conditions of use and aging occur in opposite directions. Regarding this point, the double GM-tube according to the present invention does not have this disadvantage since the two sensitive spaces bounded by cathodes 12 and 13, which are equivalent to those of two separate GM-tubes, contain a common gaseous compound, are subjected to the same supply voltage, have the same Geiger-Muller threshold voltage and have the same relative position with respect to the radiation to be measured. When the conditions of operation such as the supply voltage, change, it has been found experimentally that the sensitivities vary with the same relative value in both sections. This appears on the diagram of FIG. 2 as a translation of the entire curves a, b, c in a direction parallel to the axis of abscissae. It can be noted also that the lower portion of curve a, which corresponds to a small amount of radiation, is translated in the same direction. Therefore, the overall response range is about 40 dB, including 10 dB in a linear graduation at the beginning of the scale and then up to 30 dB in a logarithmic graduation to saturation. This type of operation provides a radiometer which is simple to use, maintain and calibrate.

Figure 3:
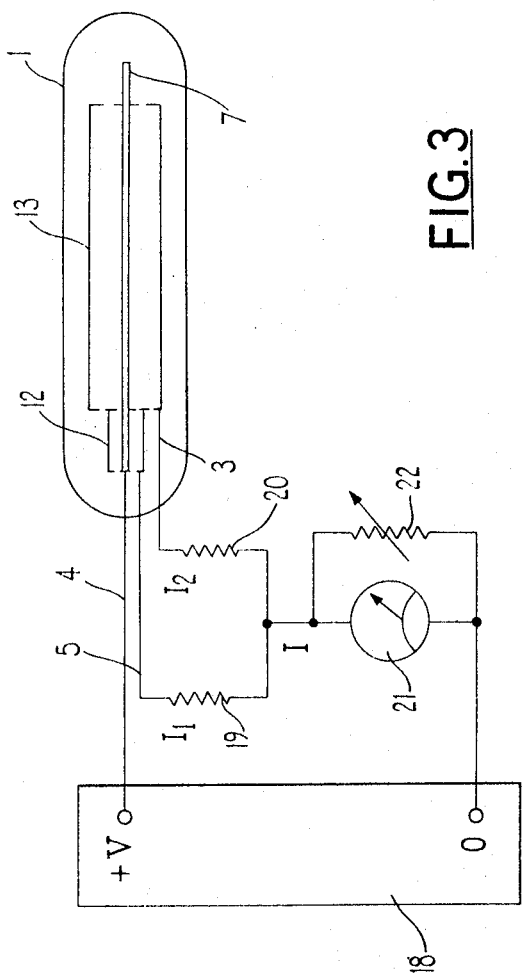
FIG. 3 is a schematic representation of a radiometer arrangement using the GM-tube according to the invention.

These advantages will be further understood by referring to FIG. 3 which schematically shows a radiometer using the double GM-tube including a glass envelope 1, anode 7 with its outlet 4, cathode 12 that surrounds the smaller sensitive space with its outlet 5, and cathode 13 surrounds the larger sensitive space, with its outlet 3. The stabilized high positive voltage, of about 400 volts, is applied to anode 7 by a supply device 18, of a suitable known type which may include the usual low voltage source, a step-up transformer for direct voltage and a voltage stabilizer. A resistor 19 is connected to outlet 5 of cathode 12 and a resistor 20 to outlet 3, of cathode 13 the values of 19 and 20 being of approximately 2 megohms. Resistors 19 and 20 have a common point to add the cathode currents and are connected back to a reference or ground potential through a microammeter shunted by an adjustable resistor 22. The microammeter scale is graduated linearly through a range of about 10 dB and then logarithmically through a range of 30 dB, and is marked in Roentgens per hour.

When a $\gamma$-radiometer having the present double GM-tube is calibrated, the tube is subjected to a standard high radiation but of a lower value than would saturate the less sensitive section. The resistor 22 is then adjusted so that the pointer of microammeter 21 is set at a mark which corresponds to the standard radiation. This operation corresponds to a translation of the whole of the curves of FIG. 2, as has been explained above. Thus the present GM-tube can be readily adapted, by an adjustment of resistor 22 in presence of a standard radiation, to the user's radiometer, with a source of stabilized voltage slightly different from the original calibration source. This feature also facilitates the periodic calibrations of the radiometer. A most significant precious advantage of the double GM-tube is in the fact that there is no risk of errors in the measurement of radiation, as can occur with the use of two separate tubes when one of them is faulty, since in this case any failure affects both sensitive spaces at the same time.

Figure 4:
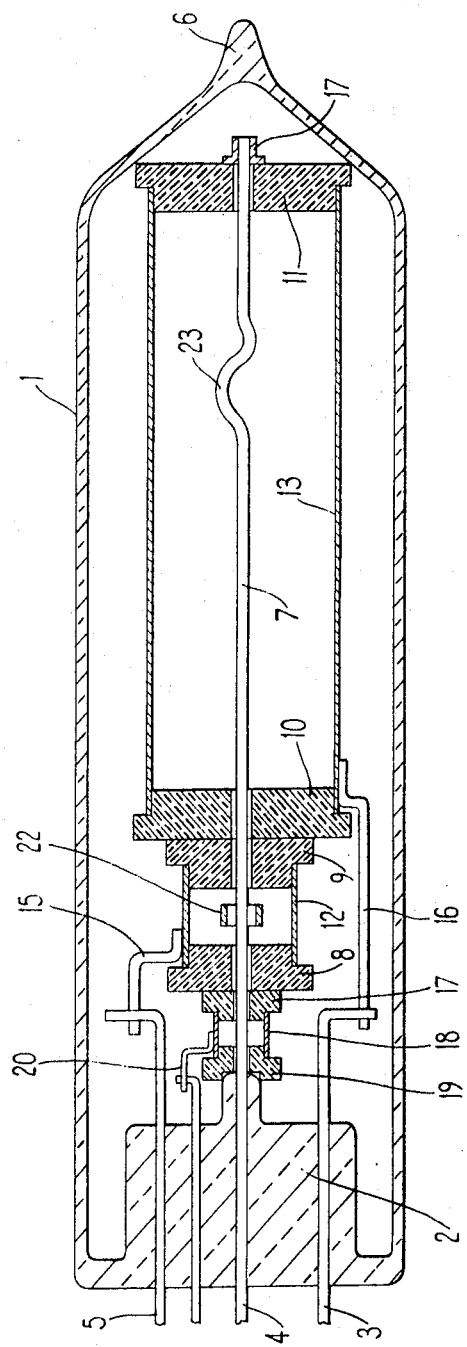
FIG. 4 shows a tube with three sensitive sections.

A GM-tube having three sensitive spaces designed according to the present invention should have a range of about 55 dB. Such a tube is shown in FIG. 4. This includes a glass envelope 1, having a base 2 including four air-tight output leads 3, 4, 5 and 20 and, at its other end, a tip 6 which is closed after use in exhausting. An extension of the central lead 4 in ferrochrome forms the anode wire 7. Insulating beads 8, 9, 10, 11, 17 and 19 of sintered glass are threaded on anode 7. Beads 17 and 19 are connected by a cylinder 18 which forms the first cathode and defines the first sensitive space. Beads 17 and 8 are adjacent one another. Beads 8 and 9 are connected by a cylinder 12 of a substantially greater size than cylinder 18 and which forms the second cathode and defines the second sensitive space. Beads 9 and 10 are adjacent one another. Beads 10 and 11 are connected by a cylinder 13 of a substantially greater size than cylinder 12 and which forms the third cathode and defines the third sensitive space. Cylinders 12, 13 and 18 are connected to leads of ferrochrome or any other conducting material which will not absorb the filling gas in envelope 1. Anode 7 is provided with a small cylinder or plate 22, also of ferrochrome, designed to enhance exchange of ions between anode 7 and cathode 14, with a bend or protrusion 23 similarly designed for enhancing exchange of ions between anode 7 and cathode 13. Elements 22 and 23 are designed as to equalize the values of the operating points, and namely the threshold voltages in the structures 7–18, 7–12 and 7–13 which define respectively the first space of smaller sensitivity, the second space of medium sensitivity and the third space of greatest sensitivity.

This GM-type having three sensitive space, is designed to reach a range of 55 dB, or in other words can measure Gamma radiation between 3 mR/h and 1,000 R/h. Examples of the cathode dimensions are as follows:

Cathode 18 : diameter, 2 mm; length, 2 mm;
Cathode 12 : diameter, 7 mm; length, 10 mm;
Cathode 13 : diameter, 15 mm; length 100 mm.

Other forms of multiple GM-tubes are adapted to measure the strength of complex nuclear radiations and may use spiral-shaped cathodes instead of the full-wall cathodes previously described or can use a gaseous filling which makes them responsive to neutron radiations. One such tube having two sensitive spaces and designed for measuring Beta radiations is shown in FIG. 5. The cathodes 12' and 13' are spiral or helical shaped in order to allow a large amount of Beta-radiations which have passed through the envelope 1, to cross freely. Envelope 1 is made thinner in the part 24 which is facing cathodes 12' and 13'. Except for elements 12', 13' and 24, the other components and dimensions of the GM-tube shown in FIG. 5 are like the ones of the GM-tube shown in FIG. 1.

Although the principles of the present invention have been described hereinabove in connection with particular embodiments, it will be clearly understood that this description has been only made by way of example and does not limit the scope of the invention.

What is claimed is:

1. A radiation counting tube comprising a hermetically sealed envelope, a gas disposed in said envelope, an anode disposed coaxially of said envelope, and a plurality of cathodes each having different areas and sensitivities disposed in spaced relation along the coaxially surrounding said anode, said cathodes being disposed within and spaced from said envelope.

2. The radiation counting tube of claim 1 wherein said anode is a longitudinal wire common to said coaxial cathodes, and separate output leads are connected to each said cathodes and said anode.

3. The radiation counting tube of claim 2 wherein said cathodes have cylindrical shapes of different lengths and diameters forming a plurality of different radiation sensitive sections about said anode, the larger lengths and diameters providing greater sensitivities.

4. The radiation counting tube of claim 3 wherein said cylindrical cathodes have helical shapes with spaces for the passage of ions.

5. The radiation tube of claim 3 wherein each of said cathodes are supported on glass discs disposed transversely of the axis of said envelope and at each end of the associated one of said cathodes, adjacent ones of said discs of adjacent ones of said cathodes being in contact with each other, each of said discs having an axial hole to support said anode and said discs associated with each of said cathodes confining the resulting ionization of their associated one of said plurality of radiation sensitive sections to prevent propagation of said resulting ionization into others of said plurality of radiation sensitive sections.

6. The radiation counting tube of claim 3 wherein said tube is of the Geiger-Muller type having a threshold voltage for operation and including means within the larger said cathodes positioned between said anode and said larger of said cathodes to equalize the threshold voltages for each section.

7. The radiation counting tube of claim 3 including voltage supply means connected between said anode and cathodes, means connecting said cathodes together, and a common current measuring means connected in series with said voltage supply means and said means connecting said cathodes to provide a single measuring scale without range switching.

8. The radiation counting tube of claim 6 wherein said means to equalize said threshold voltages includes a coaxial ring around said anode.

9. The radiation counting tube of claim 6 wherein said means to equalize said threshold voltage within the largest diameter cathode includes a bend in said anode.

10. The radiation counting tube of claim 7 wherein each cathode is sensitive to a predetermined range of radiation and the ranges are added together in said common measuring means.

* * * * *